Feb. 28, 1950 A. SIMMON 2,499,039

SENSITOMETRIC DEVICE FOR COLOR PHOTOGRAPHY USING SCANNING, RECORDING, AND COMPARING MEANS

Filed Jan. 3, 1949 4 Sheets-Sheet 1

Alfred Simmon
INVENTOR.

BY Walter E. Wollheim

ATTORNEY.

Alfred Simmon
INVENTOR.

BY Walter E. Wollheim

ATTORNEY.

Feb. 28, 1950 A. SIMMON 2,499,039

SENSITOMETRIC DEVICE FOR COLOR PHOTOGRAPHY USING SCANNING, RECORDING, AND COMPARING MEANS

Filed Jan. 3, 1949 4 Sheets-Sheet 3

Alfred Simmon
INVENTOR.

BY Walter E. Wollheim

ATTORNEY.

Alfred Simmon
INVENTOR.

BY Walter E. Wollheim

ATTORNEY.

Patented Feb. 28, 1950

2,499,039

UNITED STATES PATENT OFFICE 2,499,039

SENSITOMETRIC DEVICE FOR COLOR PHOTOGRAPHY USING SCANNING, RECORDING, AND COMPARING MEANS

Alfred Simmon, Jackson Heights, N. Y., assignor to Simmon Brothers, Inc., Long Island City, N. Y., a corporation of New York Application January 3, 1949, Serial No. 68,784

5 Claims. (Cl. 88—14)

The object of this invention is a sensitometric device for color photography or, more specifically, a device which plots automatically densities to light of three primary colors of the elements of a colored photographic reproduction as the function of densities to light of the same colors of corresponding elements of an original colored object.

A preferred embodiment of this invention is illustrated in the accompanying drawings in which Fig. 1 is an external view of the device;

Like characters of reference denote similar parts throughout the several views and the following specification.

*Representation of electrical circuits*

Figure 1:
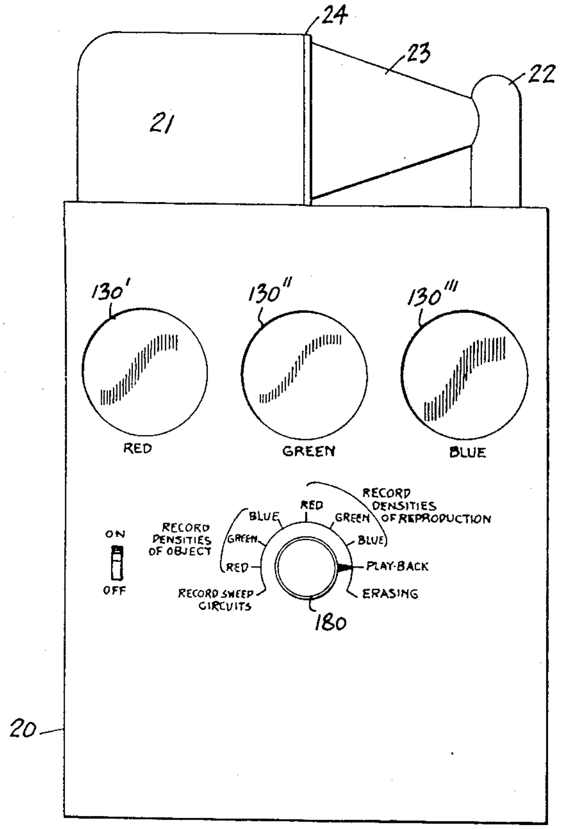

In the interest of simplicity voltage sources have in the following been represented by batteries, but it will be understood that in reality these batteries can be readily replaced by combinations of transformers, rectifiers and condensers. Linear sweep circuits or saw-tooth wave generators are all shown in block form, since their detailed construction is well known and forms no part of this invention. This is also true of carrier wave generators and the modulating and demodulating circuits associated with them. Again in the interest of simplicity amplifiers have been generally omitted and it will be understood that amplifiers may be inserted in any place in the system where their presence may appear necessary. Supply circuits for the various filaments for rectifying and cathode ray tubes have been omitted. These filaments are in reality either fed from small batteries or from filament transformers in a well-known manner. All circuits used in this device are extremely sensitive to small voltage fluctuations and, therefore, automatic voltage regulators or stabilizers must be used in order to render all voltage in the presence of small change of the line voltage. These stabilizers or voltage regulators have not been shown since their design is well known and since they form no part of this invention. Cathode ray tubes as well as photo-electric cells of the multiplier type require circuits involving multiple tap potentiometers. In the interest of clarity most tubes are shown to be connected to individual potentiometers, and individual batteries associated with these potentiometers, but in practice it will often be possible to connect several tubes to the same potentiometer and battery. Cathode ray tubes have consistently been shown equipped with electrostatic deflection means, but it will be understood that if so desired electromagnetic deflection means can be substituted therefor.

A preferred embodiment of this invention comprises a magnetic tape recording means using a relatively wide tape accommodating a plurality of parallel magnetic tracks. This tape and these tracks are indicated schematically by dotted parallel lines. This tape coacts with recording and play-back means which comprise in a known manner iron cores and coils. These recording and play-back means are schematically indicated by coils only. Winding and unwinding means for the tape have not been shown.

*General principle*

A colored object and a colored photographic reproduction made therefrom are consecutively illuminated or scanned by moving pencils of light of three primary colors. The light reflected or transmitted by these two specimens, depending upon whether one deals with transparent or opaque specimens, is measured by means of a photo-electric cell. The currents passing this cell are sent through a converting circuit and are there converted into currents proportional to the densities of the elements of the specimen, and a record is then made of these currents. In this manner eventually six records are arrived at denoting, respectively, the densities to light of three primary colors of the elements of the object and reproduction. These records are subsequently played back simultaneously and special means are provided to establish and maintain coordination between them, so that points of all six records passing the play-back means at any given instance play-back densities referring to the same element of the object and to the corresponding element of the reproduction. The play-back means comprise six circuits which carry currents proportional to the recorded densities. These currents and/or voltages proportional to them are impressed upon the deflection means of three cathode ray tubes in such a manner that the horizontal and vertical deflection, respectively, of the same tube becomes a measure of the densities to light of the same primary color of corresponding elements of object and reproduction, respectively. These cathode ray tubes, therefore, display on their screen luminous figures which directly represent the function of densities of the reproduction versus densities of the object for the three primary colors, respectively.

*Original object and photographic reproduction*

Both the original object and the reproduction made therefrom may be either transparent or opaque. In the accompanying drawings transparent specimens have been assumed, and in this case these transparencies are simply placed between the illuminating and scanning means and the photo-electric cell. For opaque specimens, this system must be slightly modified and a lens must be added which projects the moving spot of light onto the opaque specimen. The photo-electric cell in this case must be disposed in such a way relative to the specimen that it receives part of the reflected light.

It is most convenient to assume that the reproduction is made of exactly the same size as the original object, but this is not strictly necessary and smaller or larger reproductions can be accommodated if the range of the scanning movement is adjusted accordingly, whenever the reproduction is analyzed.

It is theoretically immaterial but what process the reproduction is made, but generally the object will be photographed with a camera and either a transparency in the correct color or a negative will be obtained which will then be printed in the usual manner on paper or the like.

The nature of the original is likewise of no consequence, but it is desirable that it contains substantially all conceivable color combinations in all conceivable densities, because in this manner the most complete analysis of the color process under investigation can be made. Specimens which contain substantially all conceivable color combinations in all conceivable densities or which at least approach this condition can, for example, be made by apparatus, as disclosed by me in Patents #2,446,111, 2,446,112, 2,450,307.

*External appearance*

A typical structure is shown in Fig. 1. It consists of a main cabinet 20 which has three apertures for the screens of the three indicating cathode ray tubes 130′ 130″ 130‴, an on-and-off switch, and a main control switch 180 with nine steps. On top of this cabinet is a smaller cabinet 21 which houses the scanning and illuminating means and a photocell housing 22, which is preferably connected to the former by the light collecting element 23. In the preferred embodiment of this device transparent specimens are assumed, and, therefore, a slot 24 is arranged which accepts these specimens. It may usually be desirable to provide mechanical means to adjust these specimens so that corresponding points have the same position relative to the scanning means, i. e., an adjusting means may preferably comprise means to shift the specimen horizontally and vertically as well as to rotate it. Adjusting devices of this type are well known in machine tool practice and are also incorporated, for example, in some microscopes, and their detailed construction has, therefore, been omitted from these specifications.

*Illuminating and scanning means*

Figure 2:
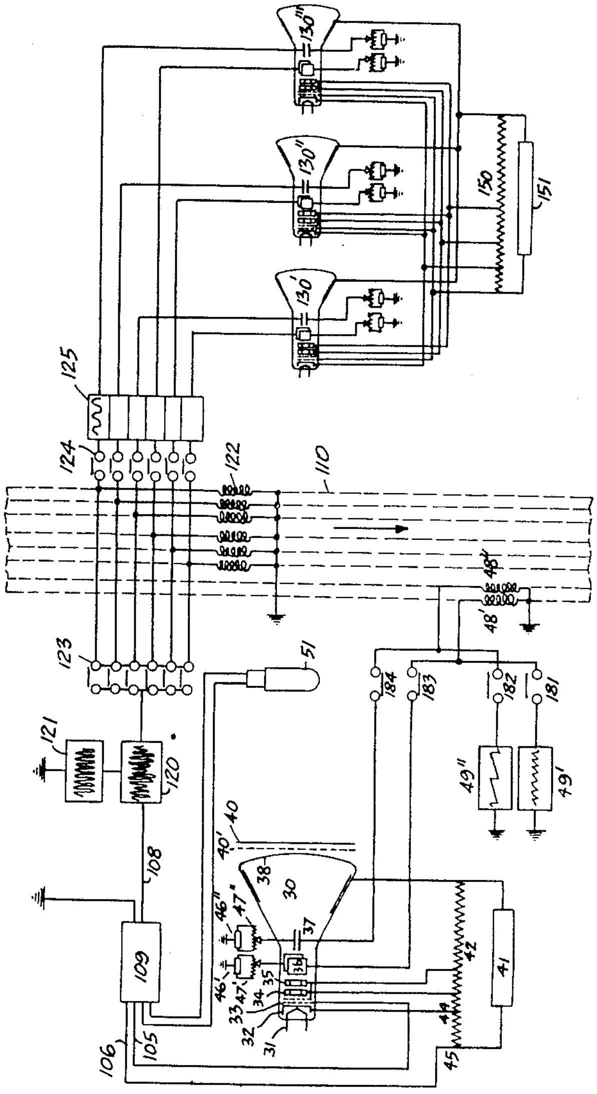
Fig. 2 is a general circuit diagram, largely schematical.
Figure 3:
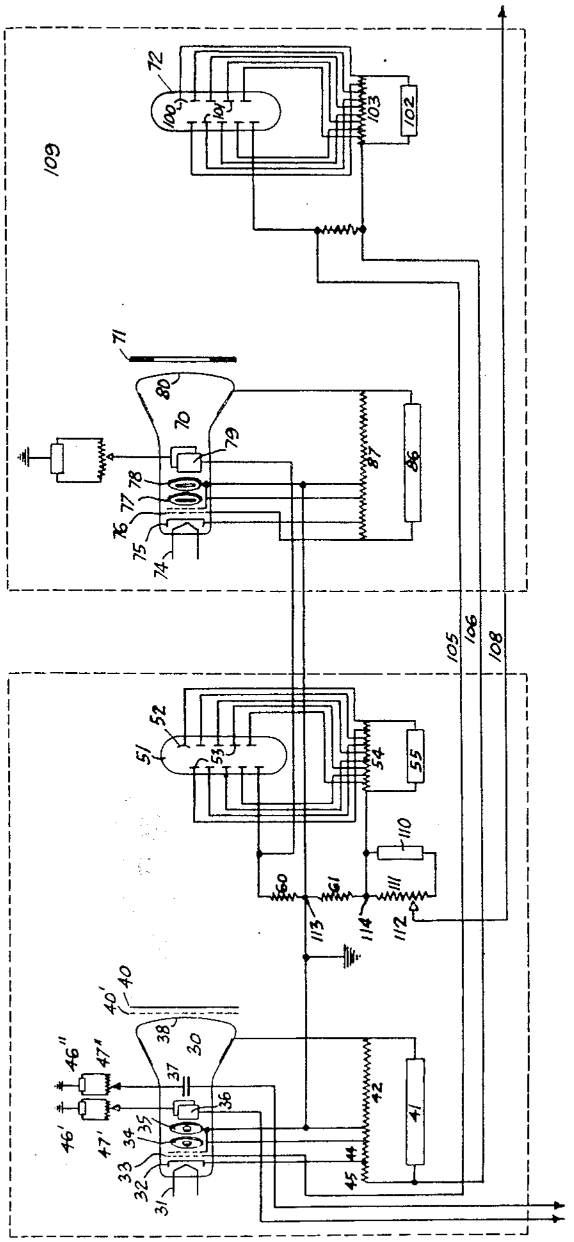
Fig. 3 is a more detailed diagram of the scanning unit and of the photocell current-density converter.

The object and its reproduction 40 are consecutively illuminated by moving pencils of light. The light may be provided by any convenient source, such as incandescent or carbon arc lamps, and likewise scanning means of any convenient design are applicable, such as, for example, rotating discs with suitable apertures on their periphery or rotating or otherwise moving mirrors or lenses. In practice, I prefer, however, to use a cathode ray tube because in this manner all mechanically moving parts are avoided, and because the light output of a cathode ray tube can be most conveniently regulated by changing the voltage impressed upon a control grid. Therefore, a cathode ray tube has been shown in the drawings, and will be described in the following paragraph:

Referring to Figs. 2 and 3, the cathode ray tube 30 is used as an illuminating means. Its component elements comprise filament 31, indirectly heated cathode 32, control grid 33, two focusing elements 34 and 35 and two pairs fo deflection plates 36 and 37. The front of the tube carries in the usual manner a light emitting screen 38.

The supply circuit for this tube is largely conventional, comprising a battery 41 connected to a potentiometer 42 with a number of taps which are connected to the elements of the cathode ray tube in the usual manner, as shown in Figs. 2 and 3.

It can be seen that the control grid assumes a certain negative potential relative to cathode 32. This negative bias consists of two parts, a fixed part which corresponds to the extreme left end of the potentiometer, i. e., to the voltage between points 44 and 45, and a variable part which is derived from the photo-electric cell through the photocell-density converter which will be described in detail later.

The deflection plates 36 and 37 are connected to linear sweep circuits of two different frequencies which cause the luminous spot on the screen to move over the screen area in a television-like manner. The detailed design of the sweep circuits is well known and they are, therefore, only shown in block form 49′ and 49″.

The arrangement used in this circuit differs from the conventional circuit used for television or the like. Usually the two sweep circuits are directly connected to the deflection plates. Here, however, the voltages and/or current waves are first recorded, the records are subsequently played back, and the played back currents and/or voltages are then impressed upon the deflection means. The advantages of this indirect way of energizing deflection means by linear sweep circuits will be explained later.

In the preferred embodiment of this invention the recording means are assumed to comprise a magnetizable tape which during recording is moved past magnetizing means which are energized by the currents and/or voltages to be recorded. The magnetizable ribbon is wide enough to accommodate a plurality of magnetic tracks which in Fig. 2 are schematically shown by a number of vertical dotted lines. The magnetizing means comprise in a known manner an iron core of suitable shape associated with a coil which the currents to be recorded pass. This iron core has a suitably shaped gap through which the ribbon is moved during operation. In the diagram of Fig. 2, these magnetizing means are indicated schematically by two coils 48′ and 48″.

For reasons which will become clear later, it is desirable to use the same magnetic assemblies which serve as recording means, also as magnetic pick ups for the subsequent play-back. While in Fig. 2 the same coils are shown to be utilized for this purpose, two different coils mounted on the same iron core could conceivably be used, and it may be advantageous in this case to use two coils of different impedances.

The function of the deflection circuits can now be understood from Fig. 2. During the recording periods contacts 181 and 182 are closed and contacts 183 and 184 are open, so that the currents or voltages generated by the linear wave generators 49' and 49'' are impressed upon recording heads 48' and 48''. During the play-back period contacts 181 and 182 are open and contacts 183, 184 are closed. Contacts 181, 182 and contacts 183, 184 are preferably actuated by a relay which forms part of the control circuit to be described later. In this manner the voltages induced by the magnetized ribbon moving past coils 48' and 48'' which now serve as pick-up heads are connected to deflection plates 36 and 37. In the latter instance it may become necessary to introduce amplifiers between coils 48' and 48'' and deflection plates 36 and 37, respectively, but in the interest of simplicity three amplifiers have not been shown.

The cathode ray tube must be equipped with a screen which emits substantially white light, and filters 40 in the three primary colors can be placed between the screen and the photo-electric cell which is part of the light measuring circuit which will be described in the next paragraph. For convenience, these filters may be connected to a movement driven either by small motors or by electromagnets, and these last-named elements may be electrically connected into the control circuit by means of which the operator controls the proper sequence of all operations. This control circuit will be described in detail in a later chapter.

Provisions must be made to render the effect of the light persistence of the screen of the cathode ray tube harmless. This can be done to a large measure by choosing the chemical composition of the screen properly. In this manner the light persistence can be reduced to a relatively small magnitude, and the remaining effect can be rendered negligible by reducing the scanning speed of the luminous spot upon the screen, or in other words, by using a relatively low frequency for the two saw tooth wave circuits which actuate the deflection plates 36 and 37.

It must be kept in mind that the absolute value of the light persistence is not important, but only its ratio to the scanning speed of the device. It will be understood that for the purpose of this invention scanning speeds may be very much lower than those used for television work. For example, whereas 30 frames per second are customary in television work, one frame per second, or even less, would be quite acceptable for the purpose of this invention.

*Means to measure light intensity*

The most important part of these means is a photo-electric cell which may be of any desired type known in the art, but in practice I prefer a so-called photo-electric multiplier, since additional amplifiers are usually unnecessary for this type of tube. Referring to Fig. 3, this cell comprises a glass vessel 51 within which the photosensitive cathode 52 and nine additional electrodes 53 are mounted. These elements are connected to respective points of the potentiometer 54 upon which a voltage is impressed by battery 55 or equivalent source of voltage. The cathode 52 is connected to the most negative points at the extreme right of the potentiometer, and the last electrodes are connected to the extreme left point of their respective potentiometer so that they receive the most positive potential. The wire connecting the left end of each potentiometer to the last electrode is interrupted and two resistors 60 and 61 are inserted in this circuit. During operation, voltages, depending upon the resistance values of these resistors and upon the current circulating in the last loop of the photoelectric multiplier circuit, are built up across these resistors.

The distance of the photocell from the transparency and from the screen of the cathode ray tube must be sufficiently large so that all points of said transparency have substantially the same distance from the cell.

The light reaching the photo-electric cell from the screen of the cathode ray tube can be magnified by placing suitably shaped light collecting elements between screen and photocell. These light collecting elements may, for example, be truncated cones or pyramids with an inner reflecting surface, or they may be solid bodies made from glass of transparent plastic in which case the light would be directed toward the photocell by total reflection along the boundaries.

*Photocell current-density converter.—General principle*

The current passing photocell 51 is proportional to the intensity of the light which passes the specimen being analyzed, i. e., the original object or the reproduction. Since it is desired to compare densities rather than light intensities, means must be provided to produce currents or voltages which are proportional to the densities to be measured. This is the purpose of the photocell-density converter. Therefore, this converter may comprise suitable networks with a non-linear response in such a way that the photocell currents fed into them are proportional to the intensity of the impinging light, and that the currents or voltages delivered by this converter are proportional to the corresponding densities. Many networks with non-linear responses are known, comprising for example non-linear resistors, vacuum tubes, saturated iron cores and similar elements. Regardless of the detailed design however, such an arrangement would suffer from the very serious disadvantage that the photocell currents themselves would have to be proportional to light intensities, and if one measures up to three densities, the light intensities and therewith the photocell currents would vary in the proportion 1:1000. It is very inconvenient, if not impossible, to design circuits which will satisfactorily cover such exceedingly wide range, and I prefer, therefore, to solve the problem in the following manner: The intensity of light impinging any given point of the specimen is modulated in accordance with the transmitted or reflected light intensity. This is done by the photocell current itself, and a voltage which is a function of said photocell current is impressed upon the grid 33 of the cathode ray tube 30, changing its light output. In this manner the fluctuations of the light impinging upon the photo-electric cell 51 are reduced, and it is now even possible to modulate the light intensities in such a manner that the resulting photocell currents become directly proportional to density values.

The converting circuit which accomplishes this function is shown schematically in block form as number 109 in Fig. 2, and is described in detail in the next two paragraphs.

*Photocell current-density converter.—Mathematical basis*

The photocell output current or, more specifically, the voltage impressed upon a resistance 68, is fed into the converting circuit. The output voltage of this circuit is then impressed upon the grid of the cathode ray tube and used there to modulate the brightness of the luminous spot formed on the screen. It is, therefore, clear that the converting circuit must deliver an output voltage which is a definite mathematical function of the input current or voltage. This mathematical function will be derived as follows:

The current passing the cathode ray tube can be expressed within certain limits by the formula $$I=I_{max}-ae \qquad (1)$$

I is the current passing the cathode ray tube at any given instance, and $I_{max}$ is the maximum permissible cathode ray tube current. This value may be determined either as the maximum current that the screen of the tube will withstand without deterioration, or it may be the maximum value for which the linear relationship between cathode ray tube current and grid bias still holds true, or it may be determined by any other convenient consideration. Both I and $I_{max}$ are conveniently expressed in micro amps ($\mu$A). $e$ is the additional negative voltage impressed upon the control grid 33 which is added to the voltage impressed upon these grids by the left end of potentiometer 42. In other words, the left end of potentiometer 42 imposes a certain constant minimum negative voltage upon the grid at all times, and the voltage $e$ which is the output voltage of the converting circuit will be added thereto. $e$ is expressed in volts. $a$ is a constant which depends upon the characteristics of the individual cathode ray tube and which has a dimension $$\frac{\mu\text{A}}{\text{Volts}}$$

The light intensity on screen 38 i. e., before the light has passed the reproduction or the original object, is again within reasonable limits directly proportional to the cathode ray tube current or $$L_1=bI \qquad (2)$$

$L_1$ is expressed in foot candles, or any corresponding metric dimension, and $b$ is a constant again depending upon the characteristic of the cathode ray tube, measured in $$\frac{\text{Foot candles}}{\mu\text{A}}$$

The light intensity, after the light has passed the transparency, is expressed by $$L_2=L_1.10^{-D} \qquad (3)$$

where D is the density of the reproduction or original at the point which, at any given distance, is illuminated by the luminous spot of the cathode ray tube.

The light intensity in the plane of the photosensitive cathode of the photo-electric cell 51 is proportional to $L_2$ but, of course, considerably smaller, depending upon the distance between the two tubes.

$$L_3=dL_2 \qquad (4)$$

$d$ is a dimensionless constant.

The photocell current is again within wide limits proportional to the light impinging upon the photo-electric cell or $$i=f.L_3 \qquad (5)$$

where $f$ is a constant denoting the light sensitivity of the photo-electric cell in $$\frac{\mu\text{A}}{\text{Foot candles}}$$

I shall now impose the condition that the converting circuit shall deliver $e$ as a function of $i$, i. e., output as a function of input current, in such a way that differences of photocell currents shall become directly proportional to density differences of the specimen to be measured, or $$i_1-i_2=h(D_2-D_1) \qquad (6)$$

$h$ is a proportionality factor which has the dimension of a current and which is expressed in $\mu$A.

$D_1$ and $D_2$ are the photographic densities of two points of the specimen, and $i_1$ and $i_2$ are the corresponding photocell currents, i. e., the currents which are measured when the luminous spot of the cathode ray tube is placed, respectively, behind the two points with the two densities $D_1$ and $D_2$.

Equations 1, 2, 3, 4 and 5 can be combined and solved for D with the following result $$D=\log\frac{bdf}{i}(I_{max}-ae) \qquad (7)$$

For $D=D_1$ there is, of course $i=i_1$ and $e=e_1$ and likewise for $D=D_2$ there is $i=i_2$ and $e=e_2$. By substituting these values, I arrive at the following expression for $D_2-D_1$:

$$D_2-D_1=\log\left(\frac{I_{max}-ae_2}{i_2}\right)-\log\left(\frac{I_{max}-ae_1}{i_1}\right) \qquad (8)$$

$D_2-D_1$ can also be computed from Equation 6:

$$D_2-D_1=\frac{i_1-i_2}{h} \qquad (9)$$

In the two Equations 8 and 9, $e_2$ becomes zero, and $i_2$ becomes $i_{min}$ for $D_2=\Delta_{max}$, where $\Delta_{max}$ is the highest density within the measuring range of the device. $\Delta_{max}$ usually need not exceed the value 3.

$$\Delta_{max}-D_1=\log\left(\frac{I_{max}}{i_{min}}\right)-\log\left(\frac{I_{max}-ae_1}{i_1}\right) \qquad (8a)$$

$$\Delta_{max}-D_1=\frac{i_1-i_{min}}{h} \qquad (9a)$$

These two equations can be combined and solved for $e_1$ with the following result:

$$e_1=\frac{I_{max}}{a}\left[1-\frac{i_1\cdot 10^{-\frac{i_1}{h}}}{i_{min}\cdot 10^{-\frac{i_{min}}{h}}}\right] \qquad (10)$$

This is the mathematical function according to which the converting circuit must work, i. e., when the spot of a cathode ray tube passes a point with the density $D_1$, a photocell current $i_1$ will be generated which, by the converting circuit, will be changed into a voltage $e_1$ which is then impressed, in addition to a constant negative bias, upon the control grid of the cathode ray tube.

The converting circuit can be simplified by not adding a voltage according to Formula 10 to the fixed negative bias, but deducting a voltage therefrom which corresponds merely to the second term in the bracket of Formula 10, i. e., $$e_1'=\frac{I_{max}}{a}\cdot\frac{i_1\cdot 10^{-\frac{i_1}{h}}}{i_{min}\cdot 10^{-\frac{i_{min}}{h}}} \qquad (10')$$

The value $i_{min}$ which appears in Formula 10 and 10′ is the minimum current which will pass the photocell when the density of a point illuminated by the cathode ray tube spot becomes $\Delta_{max}$, which is the maximum density which the device shall be capable of measuring and which rarely, if ever, needs to exceed the value of 3. $I_{min}$ can be computed from the Formulae 1 to 5 by substituting $\Delta_{max}$ for D and by making $e_1$ zero, i. e., $$i_{min}=bdfI_{max}.10^{-\Delta max} \qquad (12)$$

Of ultimate interest, however, are not density differences, but absolute values of densities, and these are obtained from a network which comprises a resistor 61 carrying the photocell current of cell 51 and which is in series with potentiometer 111 receiving, in turn, a voltage from a battery or other source of voltage 110. The connection of the battery must be so chosen that the polarity of potentiometer 111 is opposed to that of resistor 61 or, in other words, the voltage between the sliding contacts 112 of the potentiometer and point 113 is the difference of the respective voltage impressed upon 111 and 61. The function of this network can be explained as follows:

Assuming that the resistance of 61 is R, and that the voltages corresponding to photocell currents $i_1$, $i_2$ are $E_1$ and $E_2$, Equation 6, can be transformed to read:

$$E_1-E_2=-hR(D_1-D_2)$$

For $D_1=0$, $E_1$ will become $E_{max}$, so that we have $$E_{max}-E_2=+hRD_2$$

This means that if I impress a voltage equal to $E_{max}$ between points 112 and 114 which is opposed to the voltage impressed upon 61, that then the voltage between points 113 and 112 is directly proportional to the density $D_2$ of that point which at any given distance is illuminated by the scanning beam of the cathode ray tube 30.

If one has transparent test specimens such as presupposed up to this time, the adjustment of the sliding contact 112 of potentiometer 111 is particularly easy because all one has to do is to remove the test specimen 40 altogether so that one has zero density, and then adjust sliding contact 112 until the voltage between points 113 and 112 becomes zero. With an opaque test specimen this adjustment is a little more difficult because even a completely unexposed white piece of paper is not of zero density because it reflects less than 100% of the incident light. However, this reflectivity can be measured by other well known means, and the device can then be adjusted accordingly making proper allowance for the fact that the maximum reflection may be, for example, of the general order of 90%.

*Photocell current-density converter.—Preferred design*

The design of the converting circuit itself is basically of no importance and any circuit which will convert input current into output voltage according to Formulae 10 or 10′ will be satisfactory. A preferred converting circuit, however, has been disclosed in my copending application, Serial #791,439, now Patent No. 2,474,380 of June 28, 1948 and will be described as a preferred example in the following:

A converting circuit built accordingly consists of three principal parts, cathode ray tube 70, stationary mask 71 and photo-electric cell 72. It is emphasized that the cathode ray tube 70 and the photo-electric cell 72 are in no way identical with elements 30 and 51 which have been described above. They are entirely independent therefrom and perform entirely different functions.

The broad principle of the converting circuit is that in some suitable manner a luminous line is formed on the screen of the second cathode ray tube 70, that the incoming signal which in this case is the current passing the first photocell 51 is used to deflect this line in a direction at right angles to itself and that, thereby, part of the light emitted by this line is cut off by the stationary masks placed in front of the luminous screen of tube 70. The light permitted to pass these masks is then made to impinge upon the second photo-electric cell 72 forming part of the converting circuit, but not upon tube 51. The current passing this second photo-electric cell 72 or, more precisely, the corresponding voltage impressed upon a resistor of suitable magnitude, is then supplied as additional bias to the control grid 33 of the original cathode ray tube 30 which scans the specimen in the manner described.

These circuits are shown in detail as the right half of Fig. 3. The cathode ray tube 70 contains filament 74, cathode 75, heated thereby, control grid 76, two focusing members 77 and 78 including a second control grid, one pair of deflection plates 79 and a screen 80 capable of light emittance.

The luminous line can be formed upon this screen by any desired means, for example, by giving the focusing elements 77 and 78 the proper configuration. It would also be possible to use a conventional cathode ray tube with two pairs of deflecting elements and form a luminous spot upon its screen which is, in turn, transformed into a luminous line by means of a separate sweep circuit of high frequency. In this case, a filter of proper electrical dimensions must be added to the photocell circuit to avoid the output signal of the converter being modulated accordingly.

The rest of the supply circuit for the second cathode ray tube is conventional. It consists of battery 86 and potentiometer 87, the various points of which are connected to the elements within the cathode ray tubes in such a way that the control grid 76 assumes a fixed negative potential with respect to the cathode 75, but that 77 has a positive potential with respect to 75, 78 a positive potential with respect to 77, and the screen finally a positive potential with respect to 78.

Figure 4:
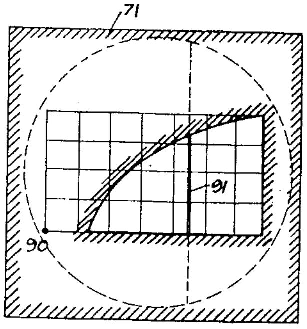
Fig. 4 is a mask which forms part of the photocell current-density converter shown in Fig. 3.

In front of the screen, and preferably immediately adjacent thereto is mask 71 which is again shown in Fig. 4. This mask has an aperture which directly represents the mathematical function expressed in Formula 10′. The mask is a thin plate made of opaque material, such as black paper or sheet metal, and its vertical width varies as a function of the horizontal distance from a point of reference 90 in accordance with Formula 10′. For convenience, the lower borderline of this aperture is made a straight line, but this is not necessary and both the upper and lower borders may be curved as long as the vertical width of the aperture is the desired function of the horizontal distance from the point of reference 90. It can be seen that only that part of the light emitted by the luminous line 91 which is behind said aperture can pass and that the other parts which are shown in dotted lines above and below this portion are blocked off. The light impinging upon the second photo-electric cell 72 is, therefore, proportional to the length of that portion of line 91 which appears behind the aperture or is a direct function of the shape of said aperture, in other words, varies in accordance with Formula 10', provided the aperture is fabricated correctly.

The respective distance between photo-electric cell 72 and the cathode ray tube 70 must, of course, be large enough so that all points of the luminous line have substantially the same distance from the photo-sensitive cathode of the photo-electric cell 72. This cell may again be of any desired design and I have again shown photo-electric multiplier tubes because then complicated amplifiers can be avoided. It again has a photo-sensitive cathode 100, and nine additional electrodes 101. The supply circuit comprises a battery 102 and a potentiometer 103, the various points of which are in the usual manner connected, respectively, to elements 100 and 101. The wire between the extreme left point of the potentiometer 103 and the last electrode is again interrupted to receive a resistance element 104. The voltage impressed upon this resistance element by the current passing it represents directly the value $e_1'$ used in Formula 10'. $e_1'$ is then by means of two wires 105 and 106 fed back into the grid control of the first cathode ray tube 30, i. e., voltage $e_1'$ is deducted from the constant negative bias which control grid 33 has with respect to cathode 32.

*Density recording device*

The output current of the photocell current-density converter, or in the specific case described in the preceding paragraph, the current passing the photo-electric cell 51 corresponding to the voltage between points 112 and 113, Fig. 3, is fed into a suitable recording device. This is done six times in succession, three times for three primary colors, respectively, for the original object, and three times for the same colors for the reproduction.

This recording device may be of any convenient design. It can, for example, be a mechanical device similar to a phonograph record, or it may be a light-sensitive film forming a record somewhat in the manner of a sound track. As the most convenient method I prefer to use a so-called magnetic wire or a magnetic tape recording device, i. e., a device which comprises a ribbon of magnetizable material which during recording is moved past a magnetizing device and which can be played back by moving it in a similar manner past a magnetic pick-up. In the preferred embodiment of my invention the same magnetic assembly is used for magnetizing as well as for pick up. The ribbon is wide enough to accommodate a plurality of magnetic tracks and is during operation moved from one storage reel to another. In a known manner the speed with which the ribbon is moved is kept constant, for example by the use of a synchronous motor, and if desired, automatic reversing means for the reels may be incorporated, so that a substantially continuous play is obtained. Generally amplifiers of suitable design are used both during recording and during the play-back cycle which I have omitted in Fig. 2. The exact construction of these recording machines as used for the present invention is not important, and they have been shown in Fig. 2 merely schematically.

The signal to be recorded contains a D. C. component which cannot be neglected, and the device differs in this respect from sound recording means. That the recording of the D. C. component is necessary becomes clear by considering that otherwise areas of uniform density, whether they be black, gray or white, would not register on the recording means and could, therefore, later not be reproduced.

Since the magnetic recording is inherently incapable of recording a D. C. component, a carrier frequency is used which is high compared to the frequency of the A. C. component of the signal. The carrier frequency is modulated in accordance with the incoming signal, and in a similar manner during the play-back cycle the obtained signal is demodulated before it is fed into the indicators. Modulating and demodulating devices of this type are well known in radio practice and, are therefore, only shown schematically in block form in Fig. 2.

The magnetic ribbon is shown schematically as 110 in Fig. 2. It is represented by eight dotted lines which denote as many magnetic tracks. Two of these tracks are used for the sweep circuits as described in a previous paragraph, and the six other tracks denote, respectively, densities in the three primary colors of object and reproduction. The output current or voltage of the photocell-density converter 109, more specifically, the voltage between points 113 and 112 of Fig. 3 as carried by wire 108, is impressed upon the modulating unit 120 which in turn receives a carrier frequency from the generator 121. The modulated carrier frequency wave is then impressed upon one of six magnetic tracks of ribbon 110. This is done by means of six magnetic recording heads 122 which are shown schematically as coils only in Fig. 2. The six heads 122 are connected to unit 120 by six pairs of normally open contacts 123 which form parts of as many relays. Only one of these relays is closed at any given time, thereby controlling the selection of one of the six heads 122 which does the recording at that time. The relays 123 are part of the control circuit which assures the proper sequence of operations and which will be described later.

During the play-back cycle the heads 122 serve as magnetic pick-ups. During this cycle all contacts 123 are left open, but all six contact pairs 124 are closed. In this manner all six magnetic records will be played back simultaneously, and the recorded wave will be fed into the demodulating unit 125. The waves generated in units 120, 121 and 125 are schematically indicated within the blocks denoting these units. The demodulated waves are then fed into the indicators to be described below.

*Means to coordinate records*

The six records denoting densities for three primary colors of object and reproduction are made consecutively, one at a time, but during the play-back period they are all played back simultaneously. Obviously it becomes necessary to coordinate them in such a way that points of the six records moving past the pick-up heads at the same time denote densities of the same element of the object and of the corresponding element of the reproduction. Were the deflection plates of the scanning tube 30 energized by two directly connected conventional sweep circuits, the probability of obtaining this objective would be very small indeed, and therefore special means must be provided to assure this coordination.

These coordinating means comprise essentially the peculiar design of the sweep circuits for the deflection plates 36 and 37 which has been described in a previous paragraph. In other words, these deflection means are not connected directly to the sweep circuits, but sweep circuit currents or voltages are first recorded and then during each of the six recording cycles for the three color densities of object and reproduction are played back, and the deflection means energized from these played back recordings. In this manner any part of the tape 110 has a very definite relation to the position of the scanning beam of tube 30, and this scanning beam will always occupy the same space within the tube, or the luminous spot between screen 38 will always occupy the same space whenever the same part of the tape 110 passes the recording of pick-up heads. Therefore, the eight tracks on tape 110 may be conceived as to contain sets of eight coordinated points, two of these points denoting the position of the luminous spot between screen 38 and the six others denoting, respectively, the density to the three primary colors of object and reproduction. It is, of course, assumed, as has been pointed out before, that object and reproduction have the same physical size and that both occupy the same relative position with respect to screen 38.

It now becomes clear why I prefer to use the same magnetic assemblies as recording as well as pick-up heads. During recording the six heads used for the six tracks denoting, respectively, densities to light of three primary colors of object and reproduction have a definite position relative to each other. If separate pick-up heads were used for the play-back cycle, these pick-up heads would have to have precisely the same location relative to each other. Unless this condition can be kept with an extremely high degree of accuracy, small, but not negligible, phase shifts are introduced between the various tracks, and this would considerably disturb the coordination of the six tracks, thereby falsifying the result. By using the same heads for both recording and play-back, this difficulty is avoided.

*Means to play-back recorded densities*

During the play-back cycle, the magnetized ribbon is again moved past the magnetic assemblies which now serve as pick-up heads. The picked up signal contains the carrier frequency and must, therefore, be demodulated. The demodulating circuits are shown in Fig. 2, schematically in block form only, and are designated as 125.

It may be mentioned that the play-back velocity of ribbon 110 must not necessarily be equal to the recording speed, but could conceivably be made faster. This would have the advantage that a continuous display on the screens of tubes 130', 130'' and 130''' is obtained, even if the recording speed is made very slow, which may be desirable in order to render effects of light persistence on the screen of the original scanning tube 30 negligible.

*Indicating cathode ray tubes*

The records of the six densities are played back simultaneously and are demodulated in the demodulating unit 125. From there they are introduced into three cathode ray tubes, or more specifically to their horizontal and vertical deflection units, respectively, in such a way that one deflection unit of one tube is actuated by the voltage representing the density of an element of the object to light of one primary color, and the other deflection plate of the same tube is actuated by the voltage representing the density of the corresponding element of the reproduction to light of the same primary color. The luminous figure on the screen of this tube then represents densities to light of one primary color of the reproduction as a function of densities to light of the same primary color of the original object.

Referring to Fig. 2, the three indicating cathode ray tubes are 130', 130'' and 130'''. They have the usual elements, i. e., filament, indirectly heated cathode, control grid, focusing members, deflection plates and fluorescent screen. These element are connected in the proper sequence to points of potentiometer 150 which in turn is energized by a battery 151, or the like. All three tubes may conveniently be connected to points of the same potentiometer, or a separate potentiometer and voltage source for each tube may be employed, if desired. It can be seen that two deflection plates of tube 130' are, respectively, connected to the second and fourth magnetic track on ribbon 110, as counted from the left, which may represent, for example, densities to red light of the original object and of the reproduction, respectively. In like manner, deflection elements of tube 130'' are energized by the fourth and seventh magnetic tracks which may, for example, represent densities to green light of object and reproduction, and finally the deflection elements of tube 130''' are actuated by the fifth and eighth magnetic tracks of ribbon 110 which may represent densities to blue light of object and reproduction.

*Control circuit*

Figure 5:
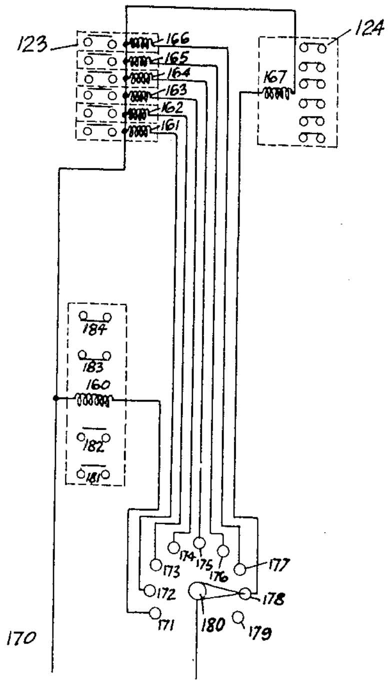
Fig. 5 is a control circuit by means of which the operator can cause the device to perform the desired operations in the proper sequence.

From the foregoing description it will be understood that the circuit as shown schematically in Fig. 2 must be operated in a certain and predetermined sequence. A control circuit is provided for this purpose. Merely as an example of convenient design it is shown to consist of a number of relays which are actuated by a master switch. The contacts of these relays are shown in Fig. 2, and the complete relays with the master switch are shown in Fig. 5. Altogether eight relays are shown, namely 160, 161 to 166 and 167. One side of all relay coils is connected to a common bus bar 170, whereas the others are connected to buttons 171 to 178 of a nine step switch 180. The last button of this switch 179 is shown not connected to any electrical element. In reality it will actuate an erasing element which is not shown in the diagram.

Relay 160 is equipped with two normally open pairs of contacts 181 and 182, and two normally closed pairs of contacts 183 and 184. The result is that when coil 160 is energized, switch 180 on button 171, sweep circuits 49' and 49'' are connected by contacts 181 and 182 to recording coils 48' and 48''. When switch 180 is on any of the other buttons but 171, coil 160 is de-energized, closing contacts 183 and 184, thereby connecting coils 48' and 48'' which now serve as magnetic pick-ups to the deflection plates 36 and 37.

Relays 161 and 166 are, respectively, connected to switch buttons 172 to 177. Consequently when switch 180 is on button 172, the contacts associated with relay 161 are closed, causing the output current or voltage of unit 120 to be impressed upon the extreme left recording coil 122.

In like manner the output of unit 120 is impressed upon any of the other recording heads 122 depending upon which of the contact pairs 123 is closed which, of course, is controlled by the position of switch 180 upon one of the buttons 172 to 177.

While it has not been shown in the appended drawings, it will be understood that an electro-magnetic shifting device for the filter 40′ could conveniently be operatively associated with this control circuit. These shifting devices may comprise electro-magnets or small motors which, for example, could be controlled by a switch similar to 180 shown in Fig. 5, which would be in any convenient manner electrically or mechanically connected to it. For example, when switch 180 is on button 172 or 175, a red filter could be in front of the screen 38. Likewise a green filter would be used when switch 180 is on button 173 and 176, and a blue filter for button 174 and 177.

During the play-back period, switch 180 is on button 178, thereby energizing the coil of relay 167. This relay is equipped with six normally open contacts. When its coil is energized, all contacts are closed and, therefore, all recording or pick-up heads 122 are simultaneously connected to the play-back circuit, including the three indicating cathode ray tubes 130′, 130″, 130‴, in the manner described above.

*Operation*

The operation of the device can now be fully understood. The operator places main control switch 180 successively into its nine positions and then causes by means of the main switch the device to record or play back the various densities. The following is a detailed, step-by-step, description of this operation.

*Step 1.—Record sweep circuits.*—The contact blade of main control switch 180 is on button 171, thereby energizing relay coil 160 which in turn closes contacts 181 and 182 and opens contacts 183 and 184, Fig. 5. This in turn connects sweep circuit generators 49′ and 49″ to the recording heads 48′ and 49′. At the same time these heads are disconnected from the deflection plates 36 and 37, since contacts 183 and 184 are opened.

*Step 2.—Record densities to red light of the object.*—Switch 180 is on button 172 energizing relay 161. The contacts associated with this relay connect one of the recording heads 122, in this case the extreme left one, to the output of the modulating unit 120. This unit modulates the output of the carrier wave generator 121 according to the output of the photocell current-density converter 109.

During this period the filter 40′ is assumed to be of red color. Since coil 160 is de-energized, the normally closed contacts 183 and 184 connect the magnetic heads 48′ and 48″ to the deflection plates 36 and 37, respectively, of the cathode ray tube 30.

Consequently the luminous spot on screen 38 scans the object 40 in a televisionlike manner, and part of the light passing said object is picked up by photocell 51. The photocell current is then by unit 109 converted into a current or voltage proportional to the scanned densities.

In the preferred embodiment of this scanning and converting circuit which is shown in Fig. 3, a voltage corresponding to the current passing photocell 51 is impressed upon resistance 60 and operatively connected to the deflection plates 79 of a second cathode ray tube 70. This cathode ray tube is constructed in such a way that a luminous line is formed upon its screen 80 which is then deflected by the deflecting elements 79. The light of this luminous line is received by the second photocell 72, and the mask 71 with an aperture of a predetermined shape is placed between cathode ray 70 and photocell 72. This renders the light output of the luminous line which reaches photocell 72 the desired function of the current of the first photocell 51. A voltage impressed upon resistance 104 is proportional to the current passing the second photocell 72, and is impressed by wires 105 and 106 upon the control grid 33 of the first cathode ray tube 30, thereby modulating its light output in accordance with the densities of the scanned transparent object 40. The mathematical function of the converting unit, and in particular, the shape of the aperture of mask 71 have been so computed that now differences of currents passing photocell 51 are directly proportional to density differences of the object 40.

By means of a network comprising the resistance 61, resistance 111 and battery 110, these density differences are related to a proper point of reference and thereby converted into absolute density values. A voltage of current proportional to density values is then carried by wire 108 and fed into the modulating unit 120.

As shown in Fig. 2, "red" densities of the object are impressed upon the third magnetic track, counted from the left, of the magnetizing ribbon 110.

*Steps 3 and 4.*—These steps are in all respects identical with step 3, except that switch 180 is connected, respectively, to buttons 173 and 174, energizing thereby, respectively, relays 162 and 163. This causes the measured densities to be recorded, respectively, upon the third and fourth magnetic tracks, counted from the left, or ribbon 110. During these recording periods, the filter 40′ must be of a "green" and "blue" color, respectively.

*Steps 5, 6, and 7.—Recording "red," "green" and "blue" densities of reproduction.*—The specimen 40 now represents a photographic reproduction made from the original object. The device goes again through the three cycles precisely as described above. Switch 180 is connected, respectively, to buttons 175, 176 and 177, thereby energizing relays 164, 165 and 166. This in turn causes the measured densities of the photographic reproduction to be recorded, respectively, on the sixth, seventh and eighth magnetic track, counted from the left, of ribbon 110.

*Step 8.—Play-back cycle.*—Main control switch 180 is connected to switch button 178. This energizes the coil of relay 167, but leaves all other relay coils de-energized. Relay 167 has six pairs of normally opened contacts 124 which during this cycle are now closed. The magnetic recordings of the last six tracks, counted from the left, of ribbon 110 are now picked up by the magnetic assemblies 122, and are simultaneously fed into the de-modulating circuits 125. They are then selectively impressed upon horizontal and vertical deflection means of three indicating cathode ray tubes 130′, 130″ and 130‴. The selection is made in such a way that "red" densities of object and reproduction are impressed upon horizontal and vertical deflection means of tube 130′, respectively. In like manner "green" densities of object and reproduction are impressed upon deflecting means of tube 130'', and "blue" densities upon the deflection means of tube 130'''.

This causes luminous figures to appear upon the screen of said last named tube, and these figures represent directly densities of the reproduction as a function of the corresponding densities of the original object.

*Interpretation of cathode ray tube displays*

In an ideal photographic reproduction the densities of all elements would be precisely the same as the densities of corresponding elements of the original object. Consequently the display upon the screen of the indicating cathode ray tubes would be formed by straight lines which would form an angle of 45° with the horizontal and vertical. As a matter of fact, no existing photographic process will meet or even approach this ideal condition, but by this means of this invention the deviations can be judged and the quality of any particular photographic color process can be properly judged and evaluated.

The errors with which all photographic color processes are afflicted are due to two different causes. The first is due to the inevitable distortion of density values by the peculiar behavior of all photographic emulsions. This behavior has been extensively investigated, and it is not necessary to repeat these results of the investigations here in detail. Broadly, only a narrow contrast range can be reproduced, and this reproduction deviates very pronouncedly from the ideal 45° straight line. It has usually a rather strongly curved S shape.

The second source of error lies in the poor quality of the dyes which by necessity must be used. Three-color prints or transparencies are usually made by the subtractive process, i. e., they contain three superimposed layers which contain cyan, magenta and yellow dyes, respectively. The cyan dye is supposed to absorb "red" light only, but pass "green" and "blue" light without absorption. As a matter of fact no cyan dye is known which will meet this condition, and all cyan dyes absorb in addition to the "red" light, also certain quantities of "green" and "blue" light. In other words, the cyan image does not merely represent "red" densities, but also "blue" and "green" ones which are not wanted.

The same is true for the magenta, which is supposed to absorb "green," and to pass "red" and "blue." As a matter of fact, it absorbs a very appreciable amount of "red" and "blue," or the magenta layer forms not merely densities to green light, but also very appreciable densities to "red" and "blue" light. The yellow dye behaves in a similar manner, although the errors introduced by yellow are the smallest ones of the three colors.

It was presupposed that the original object contains theoretically all, and in practice at least many, combinations of all three colors. Consequently, any point which has a "red" density to be measured, i. e., which has a certain concentration of dye in the cyan layer may also have some unwanted "red" densities associated with it which originated from the magenta and yellow layers. These unwanted densities may be of any magnitude within the limits of the absorption of these particular dyes and, therefore, an uncertainty is introduced into the function of the "red" reproduction density versus "red" object density. In other words, if we had only a cyan object and a cyan reproduction, a unique relationship could be established between density values of object and reproduction, and the display upon the screen of the cathode ray tube would be formed by a small thin line, which would be merely distorted, according to the errors introduced by the behavior of the photographic emulsion. However, in reality we have the three layers and, therefore, any density to red light introduced by the cyan layer of the reproduction may be associated with unwanted densities to red light originating in the magenta and yellow layer. If the object and reproduction contain many color combinations, these unwanted added densities may be of any magnitude within certain limits and, therefore, the relationship between reproduction densities and object densities is no longer unique, but uncertain within a certain range. The result is that no longer a line is obtained which represents the desired function, but a relatively broad band, as indicated in Fig. 1.

The width of this band is a direct measure of the quality of the dyes and may conceivably be used later as a guide for any corrective masking process by means of which the unwanted densities can be reduced or removed.

If the device which is the object of this invention is used with a three colored object, the unwanted densities which are represented by the width of the band have their origin in the defective absorption of two colors. The share contributed by either color can not be determined as long as a three-color object is contemplated. However, it would be conceivable to make objects and reproductions containing only two colors, for example cyan and magenta, and cyan and yellow, and in this manner the share of each color to the color degradation would be observed, and it could be determined how much each color contributes to the unwanted densities of the reproduction which must be corrected.

What I claim as new, is:

1. A device for plotting the density to light of three primary colors, respectively, of elements of a colored photographic reproduction as a function of the density to light of the same colors of corresponding elements of an original colored object comprising: means to scan said object and said reproduction consecutively by moving pencils of light of three primary colors; means including a photo-electric cell and a supply circuit to measure the intensity of said light as modified by the respective densities of said object and said reproduction; means to convert the current passing said photoelectric cell at any given instance to a current proportional to the density of the element illuminated by said scanning pencil of light at the same instance; means to record said last-named currents whereby eventually six records are obtained indicative, respectively, of the densities to light of three primary colors of corresponding elements of object and reproduction; means to establish and maintain coordination between said six records, sets of six coordinated points of the respective records having a definite and fixed spatial relationship with each other, whereby, during the subsequent play-back period, sets of coordinated points of all six records denoting densities to light of three primary colors of the same element of the object and of the corresponding element of the reproduction, respectively, are played back simultaneously; means to play back said six records simulteneously including six independent circuits, each carrying a current representing the densities to light of one primary color of object or reproductions, respectively, three cathode ray tubes, each equipped with horizontal and vertical beam deflecting means, and electrical connections between said play-back circuits and said beam deflecting means, whereby currents and/or voltages representing densities to light of the same primary color of corresponding elements of object and reproduction are impressed simultaneously upon the two beam deflecting means of the same cathode ray tube, and whereby the screen of each tube therefore displays a luminous figure representing the function of densities of elements of the reproduction versus densities of the corresponding elements of the objects to light of one of the primary colors.

2. A device according to claim 1, said means to scan said object and said reproduction by moving pencils of light of three primary colors comprising a cathode ray tube, a supply circuit, and three filters, said cathode ray tube being independent from those mentioned in claim 1, and comprising a cathode, adapted to emit electrons, means to deflect said electrons vertically and horizontally, a screen adapted to emit substantially white light when struck by electrons, said supply circuit comprising means to accelerate said electrons, and two linear wave generators of different frequencies, operatively connected to said vertical and horizontal deflecting means, respectively, whereby a luminous spot is caused to move on the screen of said cathode ray tube in a television like manner, said filters being of three primary colors, respectively, and adapted to be placed, one at a time, between the screen of the cathode ray tube mentioned in this claim, and the photo-electric cell mentioned in claim 1.

3. A device according to claim 1, said means to scan said object and said reproduction by moving pencils of light comprising a first cathode ray tube, and a supply circuit, said first cathode ray tube being independent from those mentioned in claim 1, and comprising a cathode, adapted to emit electrons, means to deflect said electrons vertically and horizontally, a screen adapted to emit light when struck by electrons, and a control grid between said cathode and said screens, said supply cricuit comprising means to accelerate said electrons, two linear wave generators of different frequencies, operatively connected to said vertical and horizontal deflecting means, respectively, and means to impress upon said control grid a negative voltage with respect to said cathode; said means to convert currents passing said photo-electric cell mentioned in claim 1 into currents proportional to densities, comprising a second cathode ray tube, an apertured mask, and a second photo-electric cell, said second cathode ray tube being independent of the first cathode ray tube as well as of the tubes mentioned in claim 1, and including a screen, means to form a luminous line upon said screen, and means to deflect said line, said last-named means operatively connected to the photo-electric cell mentioned in claim 1 and actuated by the photocell current, said apertured mask, placed immediately in front of the screen of said second cathode ray tube, made from opaque material and having an aperture with a configuration substantially according to the formula $$Y = A^{\frac{X.10^{-\frac{X}{B}}}{C}}$$

where Y is the width of said aperture in a direction parallel to said luminous line, X the distance from a point of reference in a direction perpendicular to said luminous line, and A, B and C are constants, and said second photoelectric cell being independent of the cell mentioned in claim 1, positioned opposite the screen of the second cathode ray tube, receiving light therefrom and being operatively connected to the grid of the first cathode ray tube mentioned in this claim, whereby a negative voltage proportional to the width of said aperture at the point occupied by said luminous line at any given instance is added to the said negative voltage impressed upon the control grid of the first cathode ray tube by the supply circuit, and whereby the brightness of the light emitted by the screen of said first cathode ray tube is automatically modulated in accordance with the density of the element being scanned at any given instance.

4. A device according to claim 1, said means to record the currents which are proportional to densities comprising a ribbon of magnetizable material, means to magnetize said ribbon along a plurality of parallel magnetic tracks in accordance with the respective intensities of said currents, and means to move said ribbon, during the recording process, past said magnetizing means.

5. A device according to claim 1, said means to scan said object and said reproduction by moving pencils of light comprising a cathode ray tube and a supply circuit, said cathode ray tube being independent from those mentioned in claim 1, and comprising a cathode, adapted to emit electrons, means to deflect said electrons vertically and horizontally, and a screen adapted to emit light when struck by electrons, and said supply circuit comprising means to accelerate said electrons, and two linear wave generators of different frequencies, operatively connected to said vertical and horizontal deflecting means, respectively; said means to establish and maintain coordination between said six records including the particular design of said linear wave generators which comprises two records of linear waves of different frequencies, recorded before said six records are made, means to play back these two records during the subsequent periods when any of said six records are made, including two electrical circuits adapted to carry currents in accordance with the respective strength of said two records at any given instance, electrical connections between said two circuits and said two deflecting means of said cathode ray tube, and means to maintain a fixed spatial relationship between said two records of said linear waves, and said six subsequently made records of currents representing densities.

ALFRED SIMMON.

REFERENCES CITED

The following references are of record in the file of this patent:

UNITED STATES PATENTS

| Number | Name | Date |
|---|---|---|
| 2,375,966 | Valensi | May 15, 1945 |
| 2,434,561 | Hardy et al. | Jan. 13, 1948 |